(12) United States Patent
Dai et al.

(10) Patent No.: US 7,526,383 B2
(45) Date of Patent: Apr. 28, 2009

(54) WEATHER FORECASTING EQUIPMENT

(75) Inventors: Weiming Dai, Yongan (CN); Hua Zhang, Shenzhen (CN)

(73) Assignee: Onlywell Technology Limited, Shenzhen (CN)

( * ) Notice: Subject to any disclaimer, the term of this patent is extended or adjusted under 35 U.S.C. 154(b) by 0 days.

(21) Appl. No.: 11/856,701

(22) Filed: Sep. 17, 2007

(65) Prior Publication Data

US 2009/0088980 A1    Apr. 2, 2009

(30) Foreign Application Priority Data

Apr. 24, 2007    (CN)    ............... 2007 2 0119732 U

(51) Int. Cl.
*G01V 3/00*    (2006.01)

(52) U.S. Cl. .............. 702/2; 702/1; 702/3; 702/4; 702/5; 702/6

(58) Field of Classification Search ............ 702/1–6
See application file for complete search history.

(56) References Cited

U.S. PATENT DOCUMENTS 7,358,859 B2 * 4/2008 Chan ................... 340/601
2005/0250484 A1 * 11/2005 Rouchy et al. ......... 455/419

* cited by examiner

*Primary Examiner*—Tung S Lau
*Assistant Examiner*—Sujoy K Kundu

(57) ABSTRACT

A weather forecast providing easy access to Internet, a subscriber's network, and a computer connected to Internet or the subscriber's network for retrieving correct weather forecast information in time without being vulnerable to interference includes a casing; and a sensor unit to detect ambient weather information, a sensor signal process and data output unit to process those signals, a display unit to display weather data, and a key-in unit disposed to the casing; and further includes an interface unit to capture data from a network, and a unit to process data captured by the interface unit and convert them into that is identified by and inputted into the display unit.

2 Claims, 1 Drawing Sheet

WEATHER FORECASTING EQUIPMENT

BACKGROUND OF THE INVENTION (a) Field of the Invention

The present invention is related to weather forecast equipment, and more particularly, to portable equipment that is capable of retrieving weather forecast information from Internet or a dedicated network.

(b) Description of the Prior Art

Weather forecasting information directly affects our daily routines and we expect to access to weather forecasting information at any time when it comes to handy. Those who are frequently engaging in outdoor activities would like to have reliable control over weather forecasting information; therefore, portable weather forecast equipment becomes very important for them. As disclosed in Chinese Patent Application No. "CN200520060628.7" titled "Portable Weather Forecast Equipment", a portable weather forecast equipment includes a casing, an atmospheric pressure sensor and a temperature sensor disposed on the casing, a circuitry disposed in the casing to process signals transmitted from those sensors and to output data, a display connected to the circuitry and disposed on the casing to display weather forecast information process, and multiple push buttons to control sensor signals process and data output. Both atmospheric air sensor and temperature sensor transmit signals detected to the data process and data output circuitry for comparison and operation before outputting the results to the display connected to the circuitry to display weather forecast information. However, the precision of the portable weather forecast equipment as cited is poor to fail capturing accurate weather forecast information in time. Certain existing portable weather forecast equipment operates through a radio station. Wherein the radio station transmits with long wave the weather forecast information; the information is picked up by a radio terminal device disposed on the weather forecast equipment and then processed and outputted by a signal process and data output circuitry before being inputted into a display to display. However, this type of weather forecast equipment has a very limited application range and is vulnerable to interference; and it takes higher cost to create a dedicated radio station.

SUMMARY OF THE INVENTION

The primary purpose of the present invention is to provide a weather forecast equipment that is in simple construction and capable for capturing correct weather forecast information in time.

To achieve the purpose, the present invention is essentially comprised of a casing, and provided thereon a sensor unit to detect weather information of its peripheral disposed on the casing, a process unit to process signals transmitted from the sensor unit and to output data, a display unit connected to the signal process and data output unit to display weather information, and a key-in unit.

Wherein, the weather forecast equipment is further provided with an interface unit to capture network data and a data process and output unit to process data captured by the interface unit; and the data process and output unit converts the data captured by the interface unit into data that is identified by the display unit and inputs the converted data into the display unit.

The sensor signals process and data output unit is related to a microprocessor control unit (MCU).

The data process and output unit is related to a microprocessor control unit (MCU).

According to the construction described above, the interface unit includes an interface module to capture data from network.

The interface unit further includes a data encoding process module to process data captured by the interface unit and to re-encode the data processed, a transmission module to transmit the re-encoded data, a receiving module to receive the re-encoded data from the transmission module; and a code restoration module to process the code of the data captured by the receiving module and decode it to return to its original code.

Optionally, a transfer switch is further disposed to the weather forecast equipment to switch display signals between those outputted from the sensor signals process and data output unit and those inputted from the data process and output unit.

According to the construction described above, the interface module of the weather forecast equipment is related to a common standard interface that is capable of capturing weather forecast information from the network connected through a network interface.

The data encoding process module is related to a microprocessor control unit (MCU) that re-encodes the data captured by the interface module.

The transmission module is related to a radio transmission module that executes radio transmission of the code in a form of carrier wave.

The receiving module is related to a radio receiving module to regulate and restore the code signals on the carrier wave.

The data code restoration module is related to a microprocessor control unit (MCU) that restores the code signals inputted from the receiving module into data and immediately converts the data into data that is identified and registered by the display unit.

The key-in unit includes a mode conversion key, unit conversion key, plus key, subtraction key, light key, download key, setup key, and a signal output circuit that connected to all those keys; and the signal output circuit is separately connected to the sensor signal process and data output unit, and the data process and output unit signals.

The interface unit captures the data in the following steps: the interface unit reads out from a network database to acquire a link address for a service page assigned to a subscriber; HttpRequest is transmitted to the link address; HttpRespone transmitted from the network is received to pick up data available on the service page; and information on the service page is analyzed according to user instructions to acquire the data.

The present invention by having the interface unit that captures data from network and the data process and output unit for processing the data captured by the interface unit allows a very convenient access to a computer connected to Internet or a subscriber's network for picking up correct weather forecast information in time without being vulnerable to interference. The data coding process module to process data captured by the interface unit and to re-encode the data, the transmission module to transmit the re-encoded data, the receiving module to receive the re-encoded data transmitted from the transmission module, and the data codes restoration module to process the data codes captured by the receiving module and decode them into their original codes for realizing short-range radio transmission of the present invention provide easy access to the weather forecast information from the network.

DETAILED DESCRIPTION OF THE PREFERRED EMBODIMENTS

Figure 1:
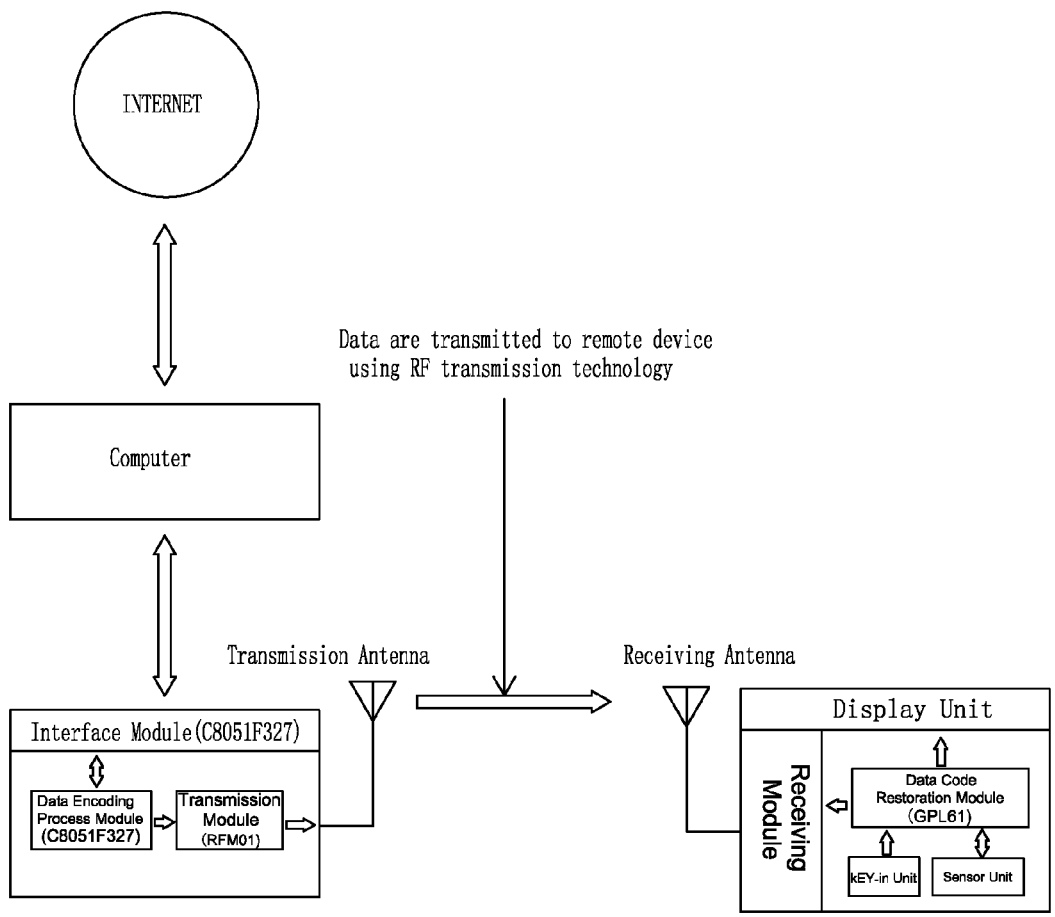
FIG. 1 is a block chart showing a circuitry principle of a preferred embodiment of the present invention.

Referring to FIG. 1 for a preferred embodiment of the present invention, a weather forecast equipment is comprised of a casing (not illustrated); a sensor unit to detect ambient weather information to its peripheral; a sensor signals process and data output unit to process sensor signals of the sensor unit; a display unit connected to the sensor signals process and data output unit for displaying weather information, and a key-in unit (not illustrated). The weather forecast equipment further includes an interface unit to capture network data and a data process and output unit to process the data captured by the interface unit. The data process and output unit converts the data captured from the interface unit into data that is identified by the display unit and inputs those data converted into the display unit. The interface unit includes an interface module to capture network data, a data code process module to process and re-encode the data captured by the interface module, a transmission module to transmit the re-encoded data, a receiving module to receive the re-encoded data from the transmission module, and a data code restoration module to process data code captured by the receiving module and decode to restore the code to its original code. In the preferred embodiment, the sensor unit is related to one that is capable of accessing to parameters related to the ambient weather conditions including temperature, humidity, and atmospheric pressure; the key-in unit includes mode conversion key, unit conversion key, plus key, subtraction key, light key, download key, setup key provided on the casing, and a signal output circuit connected to those keys. The signal output circuit is respectively connected to those signals from the sensor signal process and data output unit and the data process and output unit. The interface module of the preferred embodiment is related to a common standard interface, e.g., USB, RS232, IEEE1394, RJ45, to capture weather forecast information by plugging the network interface to the network; the data code process module is related to a microprocessor control unit (MCU), Model No. C8051 or C8051F327 used in the preferred embodiment that reassigns a code to the data captured by the interface module; the transmission module is related to a radio transmission module that executes radio transmission of the codes in a form of carrier wave and an RFM01 RF transmission unit is used in the preferred embodiment of the present invention; the receiving module is related to a radio receiving module that decode the carrier wave and restore it to the re-coded signals, and an RFM02 RF radio receiving unit is used in the preferred embodiment; the data code restoration module is related to an MCU that restores the re-coded signals inputted from the receiving module into data, and converts the data into that is identified by the display unit and to register the data to the display unit, and a GPL61 MCU is used in the preferred embodiment; and the sensor signal process and data output unit and the data process and outpour unit are integrated in the GPL61 MCU; a transmission antenna is included in the transmission module; and the receiving module includes a receiving antenna in the preferred embodiment of the present invention.

The weather forecast equipment further includes a transfer switch (not illustrated) to switch between those signals from the sensor signals process and data output unit and those display signals inputted from the data process and output unit. The interface unit in the preferred embodiment captures weather forecast signals from a computer connected to Internet. Multiple receiving modules to receive coded data from the transmission module and corresponding data code restoration modules to process the data codes captured by the receiving module to decode and restore those codes into data may be disposed to the preferred embodiment thus to create a mini radio network provided with multiple receiving display terminals within a comparatively shorter range.

The interface unit captures the data in the following steps:

A. The interface unit is linked to a computer linked to a network and reads out from a network database to acquire a link address for a service page assigned to a subscriber;

B. HttpRequest is transmitted to the link address;

C. HttpRespone transmitted from the network is received to pick up data available on the service page; and D. Information on the service page is analyzed according to user instructions to acquire the data.

The preferred embodiment is provided not to limit the scope of the present invention. For example, the MCU may be replaced with a PLC; and the display and the key-in unit for inputting control signals may be substituted by a touch screen; the interface unit may have direct access to the weather forecast information from Internet without depending on a computer; and the radio transmission and receive modules and their corresponding decoding modules may not be omitted by having the interface module to directly connect to the data process and output end unit. Any equivalent change made according to the form and/or structure shall be included in the protection of the present invention.

We claim:

1. A weather forecast equipment comprising a casing; and a sensor unit to detect ambient weather information to its peripheral, a sensor signal process and data output unit to process those sensor signals detected by the sensor unit, a display unit connected to the sensor signal process and data output unit for displaying weather data, and a key-in unit disposed to the casing; and the weather forecast equipment is further comprised of an interface unit to capture data from a network, and a data process and output unit to process data captured by the interface unit and to convert the data into that is identified by and inputted into the display unit;

the interface unit is comprised of an interface module to capture data from a network;

the interface unit is further comprised of a data code process module to process and re-encode data captured by the interface module and re-encode; a transmission module to transmit the data codes; a receiving module to receive the re-coded data from the transmission module; and a data code restoration module to process data codes captured by the receiving module and decode those codes to restored them into their original codes; and the weather forecast equipment is further comprised of a transfer switch to switch between those signals outputted from the sensor signals process and data output unit and those inputted for display from the data process and output unit.

2. The weather forecast equipment as claimed in claim 1, wherein the sensor signals process and data output unit is related to a microprocessor control unit; and the data process and output unit is also related to a microprocessor control unit.

* * * * *